(12) United States Patent
Kaeser et al.

(10) Patent No.: US 10,559,117 B2
(45) Date of Patent: Feb. 11, 2020

(54) INTERACTIONS AND SCALING IN VIRTUAL REALITY

(71) Applicant: GOOGLE INC., Mountain View, CA (US)

(72) Inventors: Dominik Philemon Kaeser, Mountain View, CA (US); Adam Glazier, Oakland, CA (US); Evan Hardesty Parker, Los Altos, CA (US); Matthew Seegmiller, Mountain View, CA (US); Per Karlsson, Mountain View, CA (US); Aleksandr Palatnik, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 136 days.

(21) Appl. No.: 15/352,481

(22) Filed: Nov. 15, 2016

(65) Prior Publication Data
US 2017/0228922 A1 Aug. 10, 2017

Related U.S. Application Data

(60) Provisional application No. 62/292,600, filed on Feb. 8, 2016.

(51) Int. Cl.
*G06T 15/20* (2011.01)
*G06F 3/01* (2006.01)
(Continued)

(52) U.S. Cl.
CPC .......... *G06T 15/20* (2013.01); *A63F 13/5255* (2014.09); *G06F 1/163* (2013.01); *G06F 3/011* (2013.01); *G06F 3/013* (2013.01); *G06F 3/0485* (2013.01); *G06F 3/04815* (2013.01); *G06F 3/04842* (2013.01); *G06F 3/04845* (2013.01); *G06F 3/04883* (2013.01); *G06T 3/20* (2013.01); *G06T 3/40* (2013.01); *G06T 19/003* (2013.01); *G06T 19/006* (2013.01);
(Continued)

(58) Field of Classification Search
None
See application file for complete search history.

(56) References Cited

U.S. PATENT DOCUMENTS 8,912,979 B1 12/2014 Gomez
2010/0097322 A1* 4/2010 Hu ...................... G06F 3/04883
345/173

(Continued)

OTHER PUBLICATIONS

Simon, "First person experience and usability of co-locate Interaction in a Projection-based Virtual Environment", 2005.*
International Search Report and Written Opinion received for PCT Patent Application No. PCT/US2016/066970, dated Mar. 23, 2017, 9 pages.

*Primary Examiner* — Jeffrey J Chow
(74) *Attorney, Agent, or Firm* — Brake Hughes Bellermann LLP

(57) ABSTRACT

In a system for moving and scaling in a virtual reality environment, a user may a move from a first virtual position in the virtual environment toward a selected feature at a second virtual position in the virtual environment. While moving from the first position toward the second position, a user's scale, or perspective, relative to the user's surroundings in the virtual environment, may be adjusted via manipulation of a user interface provided on a handheld electronic device.

20 Claims, 17 Drawing Sheets

(51) Int. Cl.
*G06F 3/0485* (2013.01)
*G06F 1/16* (2006.01)
*G06F 3/0481* (2013.01)
*G06F 3/0484* (2013.01)
*G06F 3/0488* (2013.01)
*G06T 3/20* (2006.01)
*G06T 3/40* (2006.01)
*G06T 19/00* (2011.01)
*A63F 13/5255* (2014.01)

(52) U.S. Cl.
CPC ............... *G06F 3/04817* (2013.01); *G06F 2203/04806* (2013.01); *G06F 2203/04808* (2013.01)

(56) References Cited

U.S. PATENT DOCUMENTS

| | | | |
|---|---|---|---|
| 2012/0308204 A1* | 12/2012 | Hwang | G06F 3/04847 386/241 |
| 2013/0321461 A1 | 12/2013 | Filip | |
| 2013/0326366 A1* | 12/2013 | Choi | H04W 4/02 715/752 |
| 2014/0063061 A1 | 3/2014 | Reitan | |
| 2014/0325429 A1* | 10/2014 | Chang | G06F 3/04847 715/786 |
| 2016/0291687 A1* | 10/2016 | Kasahara | G06F 3/0488 |
| 2017/0061702 A1* | 3/2017 | Christen | G06T 19/20 |

* cited by examiner

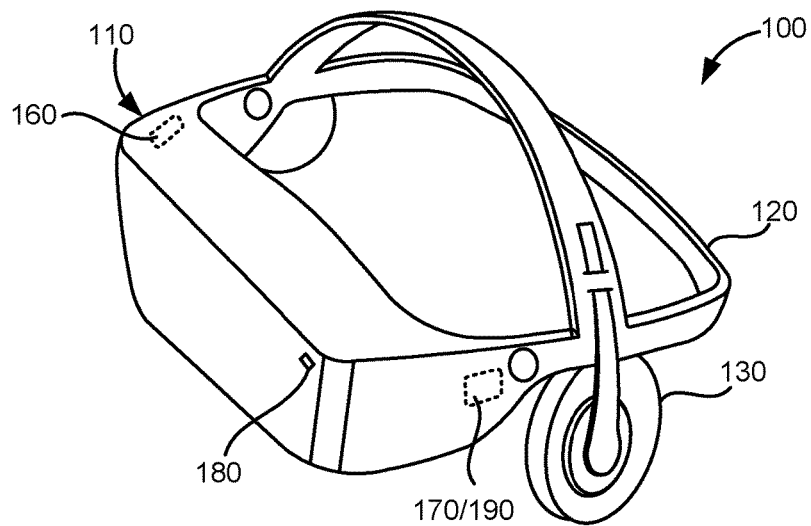
FIG. 2A
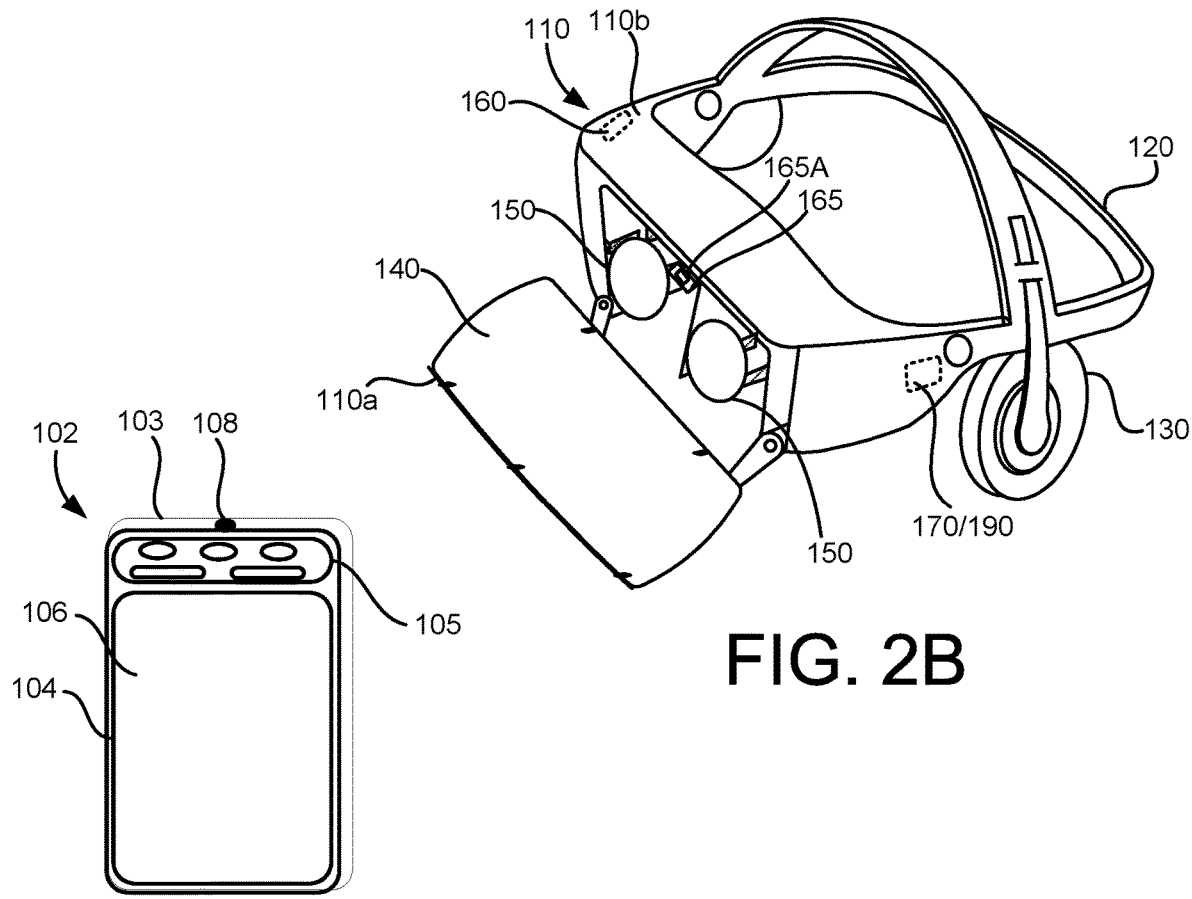
FIG. 2B
FIG. 2C

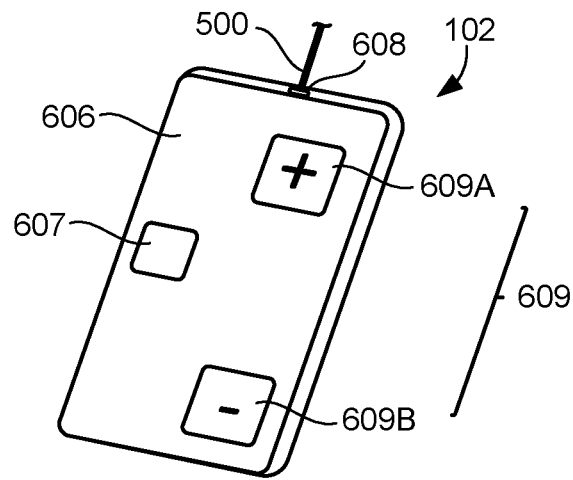
FIG. 6A
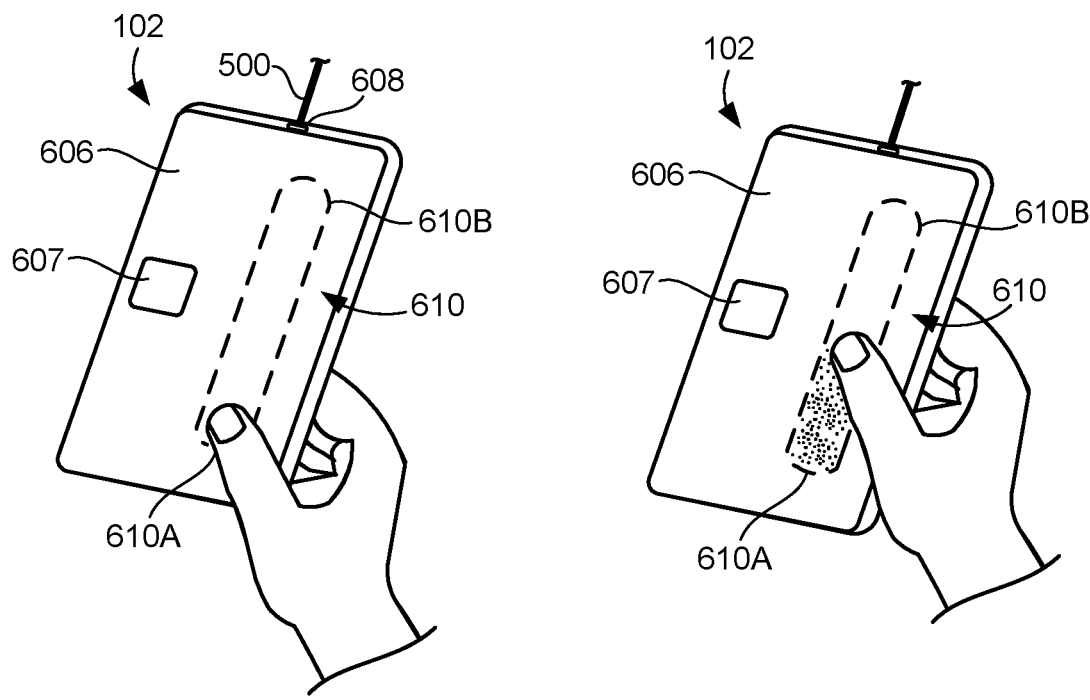
FIG. 6B
FIG. 6C

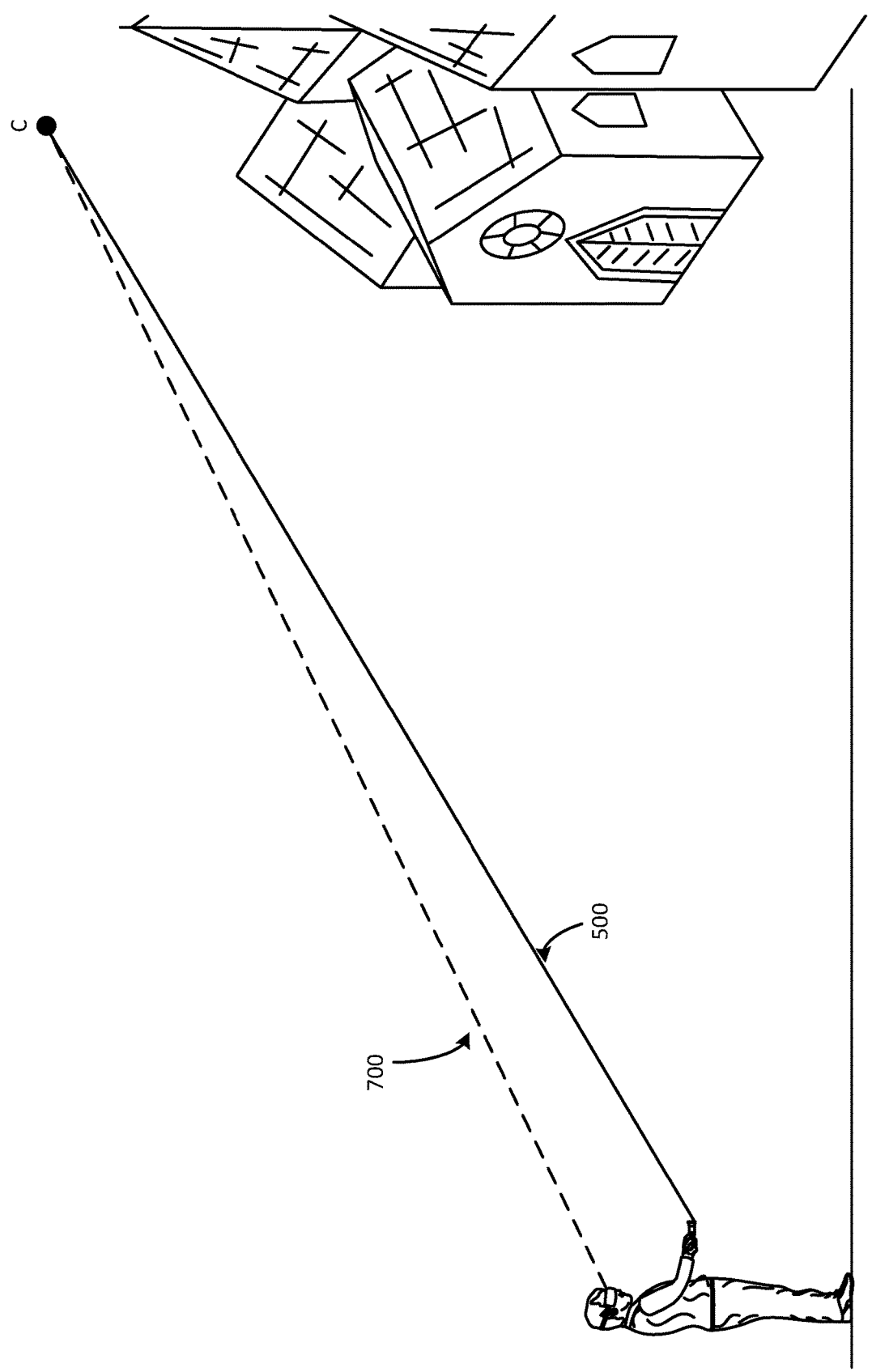

INTERACTIONS AND SCALING IN VIRTUAL REALITY

CROSS-REFERENCE TO RELATED APPLICATION

This application is a Nonprovisional of, and claims priority to, U.S. Patent Application No. 62/292,600, filed on Feb. 8, 2016, entitled "LASER POINTER INTERACTIONS AND SCALING IN VIRTUAL REALITY ENVIRONMENT", which is incorporated by reference herein in its entirety.

FIELD

This relates, generally, to movement and scaling in an augmented and/or virtual reality environment.

BACKGROUND

An augmented reality (AR) and/or a virtual reality (VR) system may generate a three-dimensional (3D) immersive virtual environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the 3D virtual environment, the user may move through the virtual environment and move to other areas of the virtual environment, through physical movement and/or manipulation of an electronic device to interact with the virtual environment and personalize interaction with the virtual environment.

SUMMARY

In one aspect, a method may include generating a virtual environment, detecting, at a user interface, a first input, the first input indicating a selection of a feature in the virtual environment, detecting, at the user interface, a second input, the second input indicating at least one of a change in position relative to the selected feature or a change in scale relative to the virtual environment, and in response to the second input, adjusting at least one of a virtual position relative to the selected feature or a virtual scale relative to the virtual environment.

In another aspect, a system may include a computing device configured to generate an immersive virtual environment. The computing device may include a memory storing executable instructions, and a processor configured to execute the instructions. Execution of the instructions may cause the computing device to generate a virtual environment, detect, at a user interface, a first input, the first input indicating a selection of a feature in the virtual environment, detect, at the user interface, a second input, the second input indicating at least one of a change in position relative to the selected feature or a change in scale relative to the virtual environment, and in response to the second input, adjust at least one of a virtual position relative to the selected feature or a virtual scale relative to the virtual environment.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are perspective views of an example head mounted display device, and FIG. 2C illustrates an example handheld electronic device, in accordance with implementations described herein.

FIGS. 6A-6E illustrate user interfaces of a handheld electronic device for movement and scaling in an augmented and/or virtual reality environment, in accordance with implementations described herein.

FIGS. 7A-7B are third person views illustrating movement and scaling of a user and/or virtual features in an augmented and/or virtual reality environment, in accordance with implementations described herein.

DETAILED DESCRIPTION

Figure 1:
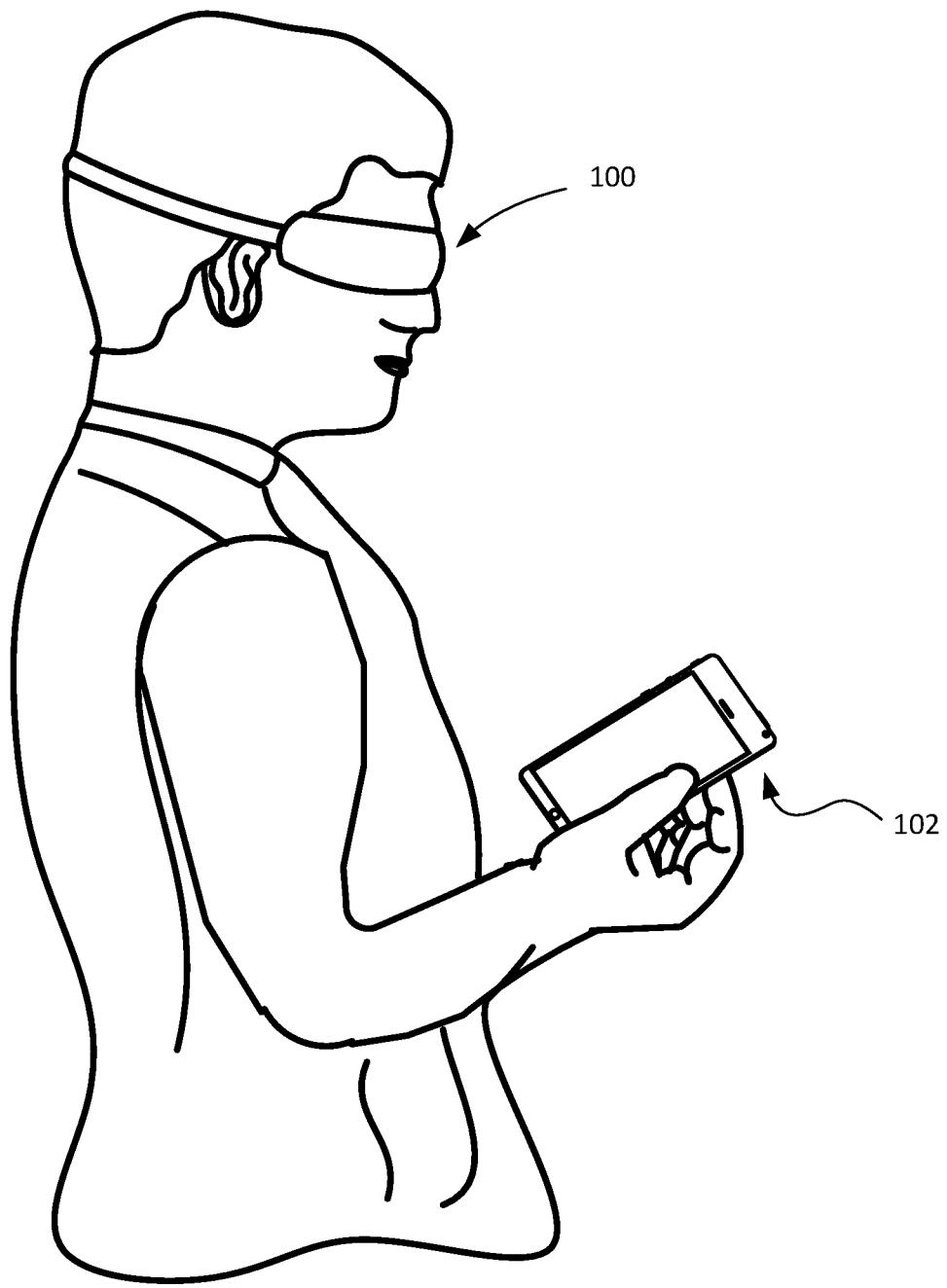
FIG. 1 is an example implementation of a virtual reality system including a head mounted display and a handheld electronic device, in accordance with implementations described herein.

A user immersed in a 3D augmented and/or virtual reality environment wearing, for example, a head mounted display (HMD) device may explore the 3D virtual environment and interact with the 3D virtual environment through various different types of inputs. These inputs may include, for example, physical interaction including, for example, manipulation of an electronic device separate from the HMD such as, for example, via a ray or beam emitted by the electronic device and/or a virtual beam rendered in the virtual environment based on the manipulation of the electronic device, a movement of the electronic device, a touch applied on a touch sensitive surface of the electronic device and the like, and/or manipulation of the HMD itself, and/or hand/arm gestures, head movement and/or head and/or eye directional gaze and the like. A user may implement one or more of these different types of interactions to execute a particular action in the virtual environment, such as, for example, moving through the virtual environment, and moving, or transitioning, or teleporting, from a first area of the virtual environment to a second area of the virtual environment, or from a first virtual environment to a second virtual environment.

A system and method, in accordance with implementations described herein, may facilitate movement in the virtual environment, for example, teleportation or transport, from a first area of the virtual environment to a second area of the virtual environment, and/or from a first virtual environment to a second virtual environment. Along with this movement in the virtual environment, a system and method, in accordance with implementations described herein, may also allow the user to scale in size, either together with this movement, or in addition to this movement, or instead of this movement. This scaling of the user's size may correspond to, for example, a change in the user's perspective relative to virtual features in the virtual environment, allowing the user to view and experience the virtual environment from different perspectives. For example, by increasing a user's scale, relative to a fixed reference such as, for example, a virtual ground level in the virtual environment, the user may view and experience the virtual environment as if the user has increased in size relative to the virtual features in the virtual environment, with the virtual features now appearing smaller. This may instead be considered a virtual scaling down of the virtual features in the virtual environment, yielding a similar change in user perspective with respect to the virtual features. Similarly, by decreasing the user's scale, relative to a fixed reference such as the virtual ground level in the virtual environment, the user may view and experience the virtual environment as if the user has decreased in size relative to the virtual features in the virtual environment, with the virtual features now appearing larger. This may instead be considered a virtual scaling up of the virtual features in the virtual environment, yielding a similar change in user perspective with respect to the virtual features.

In the example implementation shown in FIG. 1, a user wearing an HMD 100 is holding a portable handheld electronic device 102. The handheld electronic device 102 may be, for example, a smartphone, a controller, a gyromouse, a joystick, or another portable handheld electronic device(s) that may be paired with, and communicate with, the HMD 100 for interaction in the immersive virtual environment generated by the HMD 100. The handheld electronic device 102 may be operably coupled with, or paired with the HMD 100 via, for example, a wired connection, or a wireless connection such as, for example, a WiFi or Bluetooth connection. This pairing, or operable coupling, of the handheld electronic device 102 and the HMD 100 may provide for communication and exchange of data between the handheld electronic device 102 and the HMD 100, and may allow the handheld electronic device 102 to function as a controller for interacting in the immersive virtual environment generated by the HMD 100. That is, a manipulation of the handheld electronic device 102, such as, for example, to generate a virtual beam or ray emitted by the handheld electronic device 102 directed to a virtual object or feature for selection, and/or an input received on a touch surface of the handheld electronic device 102, and/or a movement of the handheld electronic device 102, may be translated into a corresponding selection, or movement, or other type of interaction, in the immersive virtual environment generated by the HMD 100. For example, the HMD 100, together with the handheld electronic device 102, may generate a virtual environment as described above, and the handheld electronic device 102 may be manipulated to effect a change in scale, or perspective, of the user relative to the virtual features in the virtual environment as described above.

FIGS. 2A and 2B are perspective views of an example HMD, such as, for example, the HMD 100 worn by the user in FIG. 1, and FIG. 2C illustrates an example handheld electronic device, such as, for example, the handheld electronic device 102 shown in FIG. 1.

The handheld electronic device 102 may include a housing 103 in which internal components of the device 102 are received, and a user interface 104 on an outside of the housing 103, accessible to the user. The user interface 104 may include a touch sensitive surface 106 configured to receive user touch inputs. The user interface 104 may also include other components for manipulation by the user such as, for example, actuation buttons, knobs, joysticks and the like. In some implementations, at least a portion of the user interface 104 may be configured as a touchscreen, with that portion of the user interface 104 being configured to display user interface items to the user, and also to receive touch inputs from the user on the touch sensitive surface 106. The handheld electronic device 102 may also include a light source 108 configured to selectively emit light, through a port in the housing 103, and other manipulation devices 105 manipulatable by the user.

The HMD 100 may include a housing 110 coupled to a frame 120, with an audio output device 130 including, for example, speakers mounted in headphones, also be coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. In some implementations, the HMD 100 may include a sensing system 160 including various sensors and a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the handheld electronic device 102 in the real world, and/or may be displayed to the user on the display 140 in a pass through mode, allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

Figure 3:
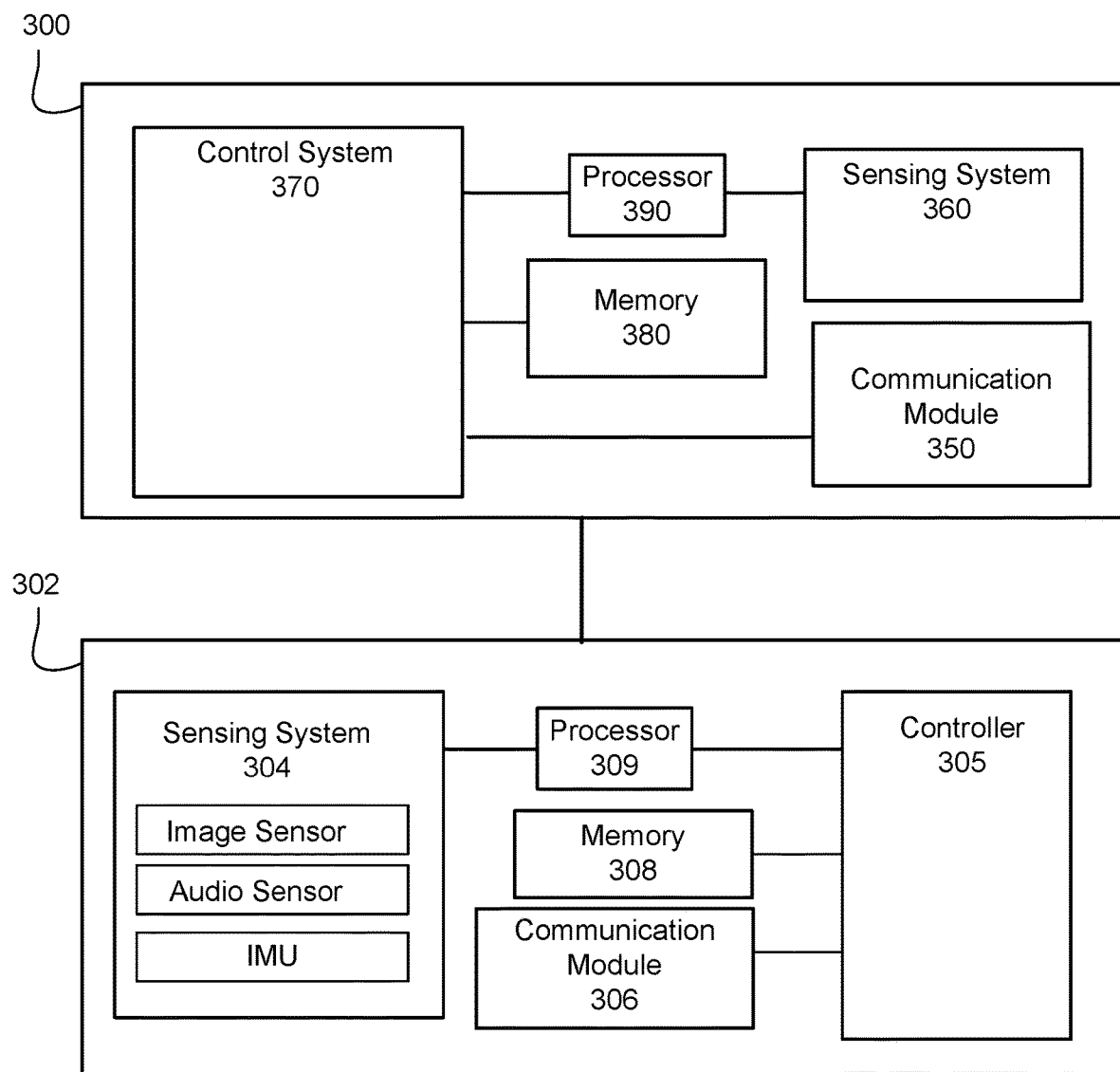
FIG. 3 is a block diagram of a head mounted electronic device and a handheld electronic device, in accordance with embodiments as described herein.

A block diagram of a system providing for teleportation and scaling in an augmented and/or virtual reality environment is shown in FIG. 3. The system may include a first electronic device 300 in communication with a second electronic device 302. The first electronic device 300 may be, for example an HMD as described above with respect to FIGS. 1, 2A and 2B, generating an immersive virtual environment, and the second electronic device 302 may be, for example, a handheld electronic device as described above with respect to FIGS. 1 and 2C, that is in communication with the first electronic device 300 to facilitate user interaction with the immersive virtual environment generated by the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300. In addition to providing for the exchange of data between the first electronic device 300 and the second electronic device 302, the communication module 306 may also be configured to emit a ray or beam as described above to communicate an electronic signal. The second electronic device 302 may include a sensing system 304 including an image sensor and an audio sensor, such as is included in, for example, a camera and microphone, an inertial measurement unit including, for example an accelerometer and/or a gyroscope and/or a magnetometer, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, a controller, such as, for example, the handheld electronic device 102 described above, may be manipulated by a user for interaction and navigation in the virtual environment. When navigating in the virtual environment, the user may direct, or point, the handheld electronic device 102 to a virtual feature to be selected, and a virtual beam may be generated by the system, based on, for example, orientation information generated by the sensors of the handheld electronic device 102, to identify the virtual feature and/or location to be selected by the user. In some implementations, the light source 108 may direct a ray or beam toward a virtual feature or item to be selected, and the ray or beam generated by the light source 108 may be detected by the system (for example, by a camera on the HMD 100) and a rendering of the detected ray or beam may be displayed to the user in the virtual environment for selection of the virtual feature.

Figure 4A:
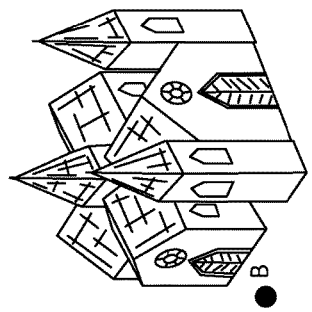
FIGS. 4A-4C and 5A-5C are third person views illustrating movement and scaling of a user and/or virtual features in an augmented and/or virtual reality environment, in accordance with implementations described herein.
Figure 4A:
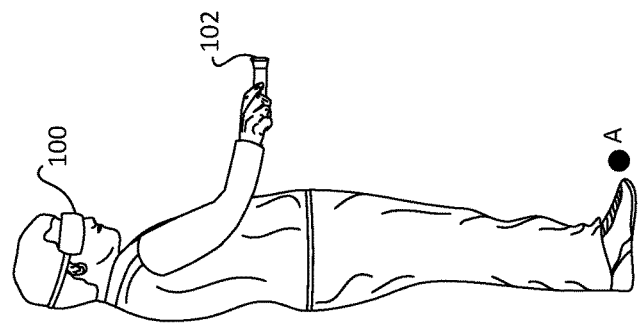
Figure 4B:
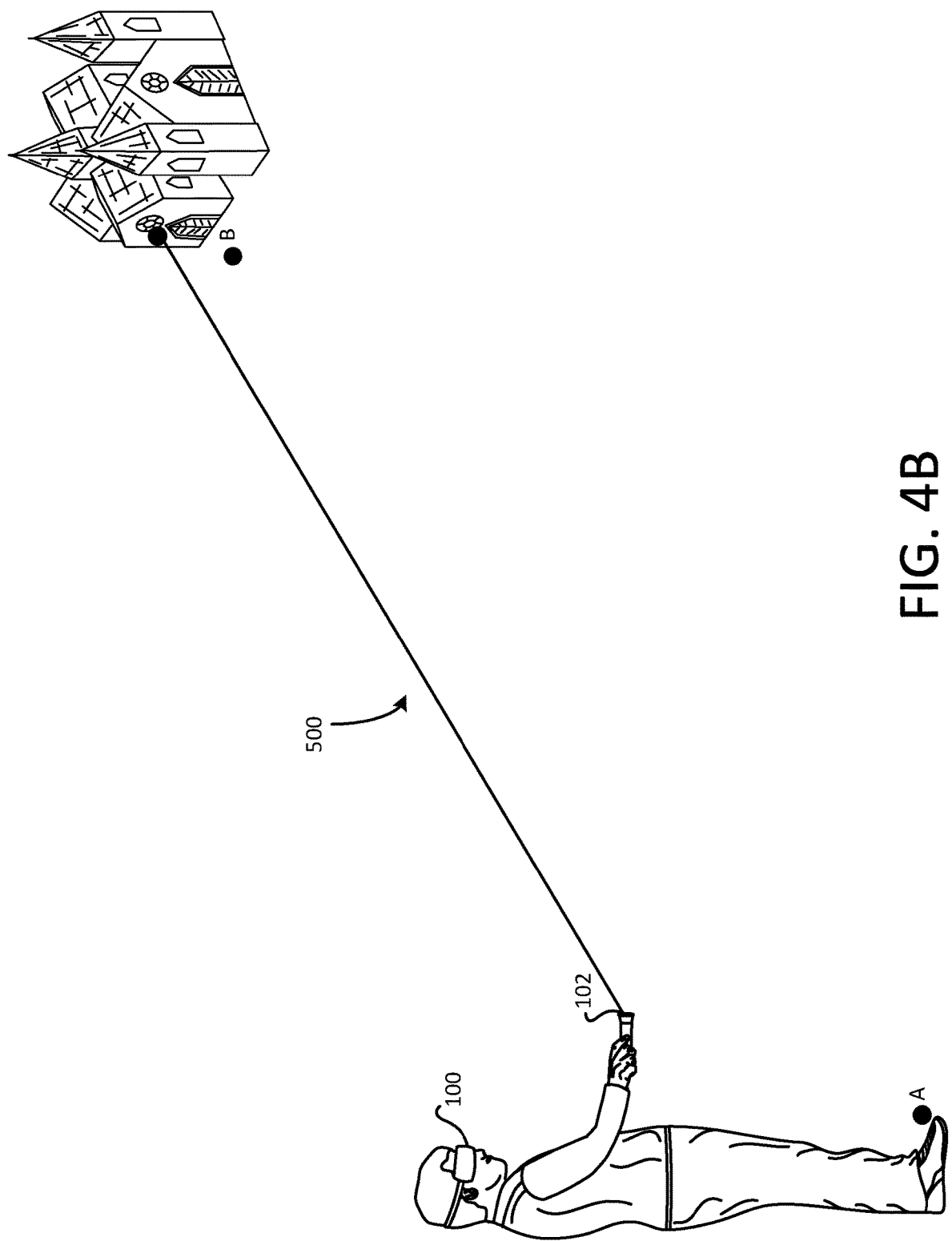
Figure 4C:
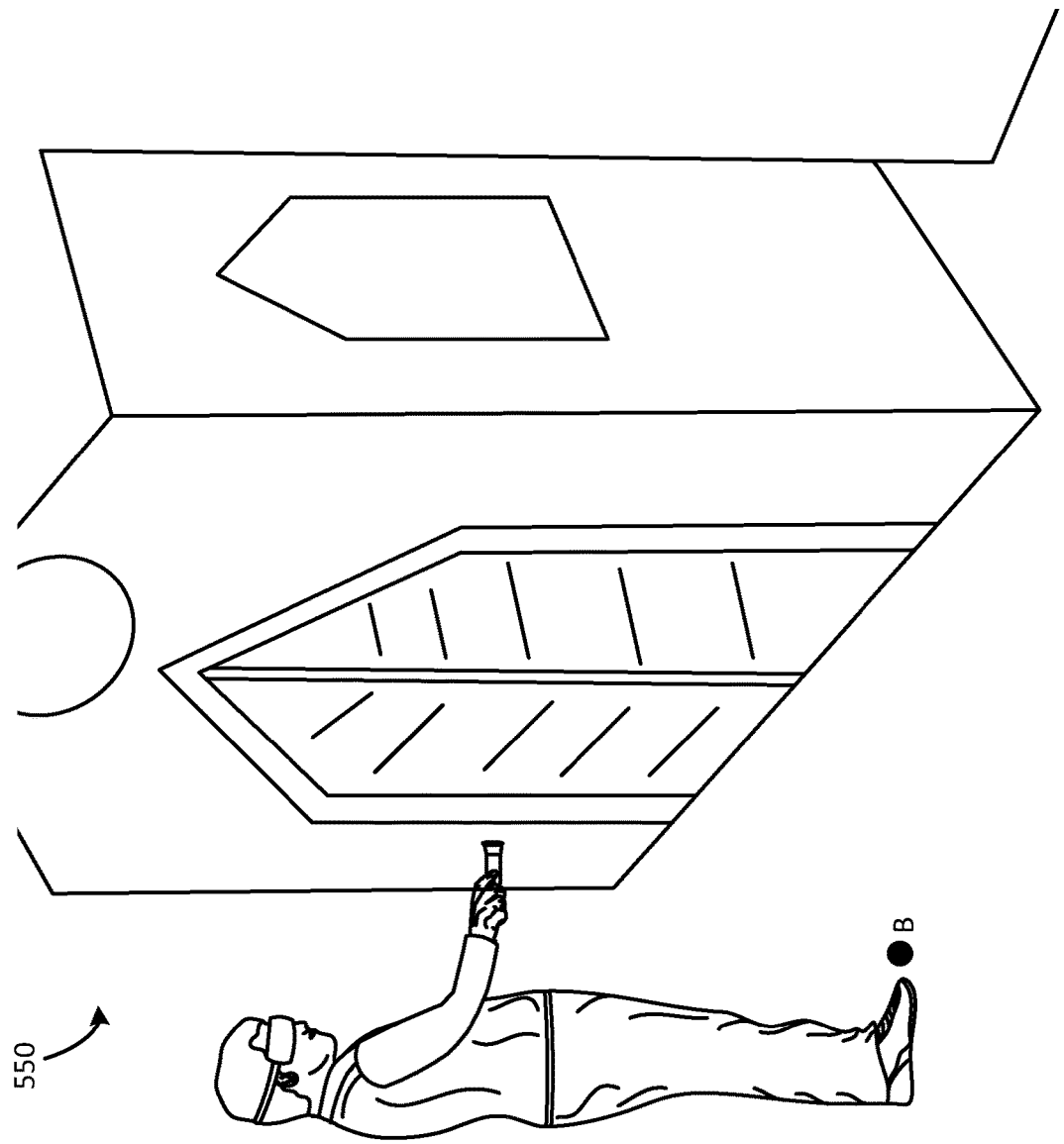

As shown in FIG. 4A, a user in a virtual environment at a position A in the virtual environment (which can be referred to as a virtual position) may choose to move to a position B in the virtual environment (which also can be referred to as a virtual position) by, for example, directing a virtual beam generated by the handheld electronic device 102 as described above toward a virtual feature 550 at the virtual position B, as shown in FIG. 4B. Upon further manipulation of the handheld electronic device 102, for example, release of a button directing the beam to the virtual feature 550 at the virtual position B, the user may be moved, or teleported, or transported, to the virtual position B, as shown in FIG. 4C. In the example shown in FIGS. 4A-4C, the user has not chosen to adjust his scale, or perspective, relative to the virtual features in the virtual environment as described above. Thus, in this example, the user is moved, or teleported, or transported, to the virtual position B at essentially the same scale (relative to the features in the virtual environment) as at the virtual position A.

In some implementations, the movement of the user from the virtual position A to the virtual position B, in response to the input by the user, for example, via the handheld electronic device 102, may be substantially immediate, with the user being at the virtual position A at one moment, and at the virtual position B the next, making the movement from the virtual position A to the virtual position B feel substantially instantaneous to the user. In some implementations, the user may experience a dynamic virtual animation of the movement of the user from the virtual position A to the virtual position B, as if the user were actually traveling through the air and/or over the terrain from the virtual position A to the virtual position B, providing the user with a more connected virtual experience in moving from the virtual position A to the virtual position B.

In some implementations, whether the user's movement from the virtual position A to the virtual position B is substantially immediate, or the user experiences a dynamic virtual animation in moving from the virtual position A to the virtual position B, the user may arrive at the virtual position B and come to a gradual stop, rather than an abrupt stop. This gradual stop (rather than an abrupt arrival, or stop), which may maintain some feeling of the user's momentum when moving from the virtual position A to the virtual position B, may provide the user with a more natural transition into the virtual environment at the virtual position B.

In some situations, the user may wish to increase or decrease his scale relative to the virtual features in the virtual environment, or to scale the size (i.e., increase or decrease) of the virtual features in the virtual environment relative to the user. This virtual scaling of the user's size relative to the virtual environment, or the virtual scaling of the virtual features in the virtual environment relative to the user, may be done when also moving from a first virtual position or location to a second virtual position or location in the virtual environment, allowing the user's perspective, or view, to be scaled or adjusted in accordance with the user's selection. An example implementation of a virtual reality system which allows a user to move (e.g., teleport, transport) from a first virtual location to a second virtual location, and/or to scale a size of the user relative to the virtual features of the virtual environment (or to scale a size of the virtual features in the virtual environment relative to the user), so that the user's perspective, or view, is scaled to the newly selected scaled size, is shown in FIGS. 5A-5C and 6A-6E.

Figure 5A:
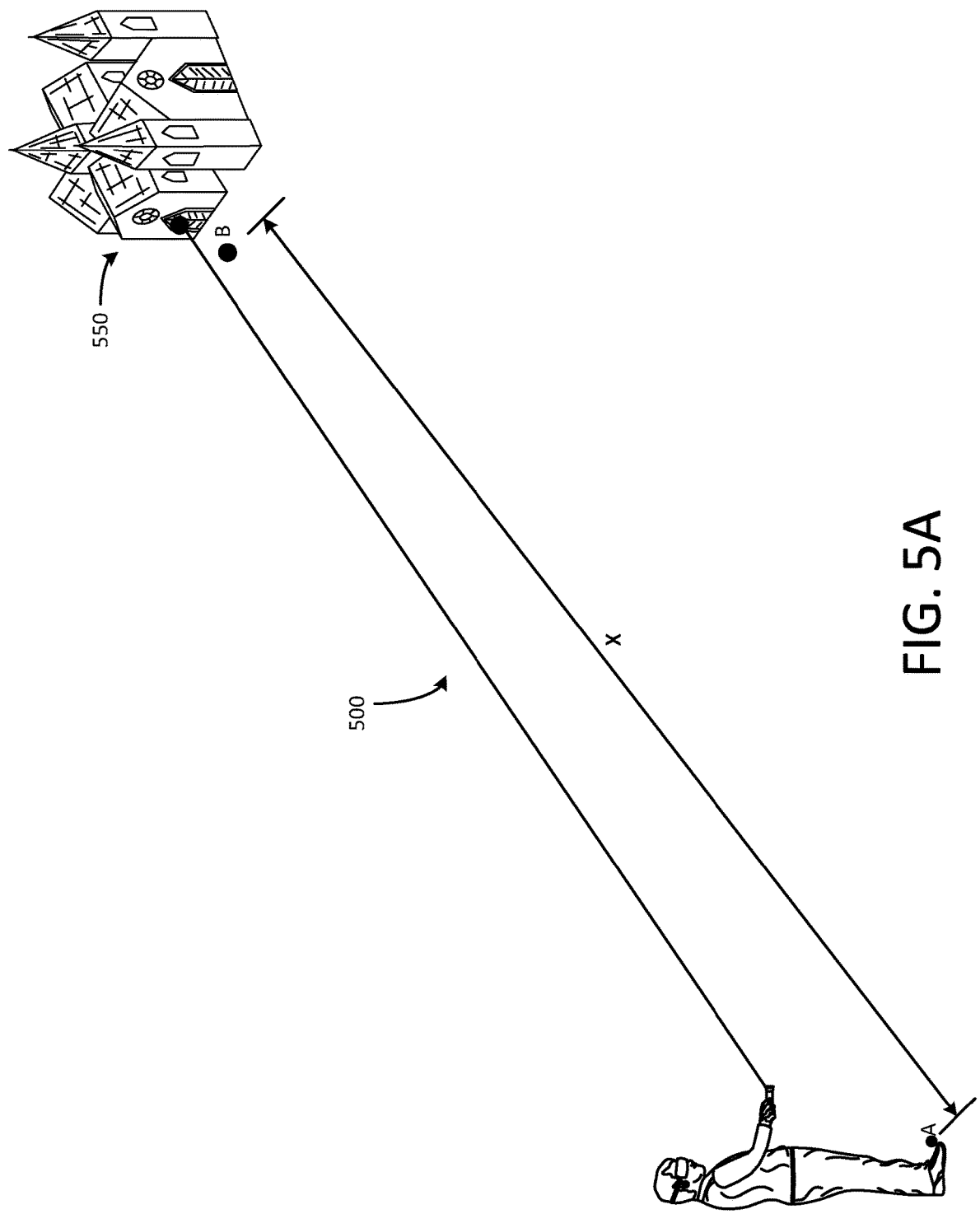

As shown in FIG. 5A, a user positioned at first virtual position A relative to a feature 550 at a second virtual position B may, for example, manipulate the handheld electronic device 102 to indicate the user wishes to move to the feature 550 at the second position B. This manipulation of the handheld electronic device 102 may, for example, cause the device to generate a beam 500 focused on the feature 550 at the second virtual position B, indicating the user wants to move (e.g., teleport, transport) to the second virtual position B, corresponding to the selected feature 550.

An example implementation of a user interface 606 which may be available to the user is shown in FIG. 6A. In some implementations, the user interface 606 may be provided on a touch sensitive portion, or touchpad, of the handheld electronic device 102 for manipulation by the user, with elements of the user interface 606 occupying designated sections of the touchpad corresponding to specific functions. In some implementations, the user interface 606 may be provided on a touchscreen display of the handheld electronic device 102, with various manipulation devices rendered as icons on the touchscreen display. In some implementations, the user interface 606 may be rendered as virtual objects in the virtual environment, for manipulation by the user. Hereinafter, simply for ease of discussion and illustration, the user interface 606 will be considered to be implemented on the handheld electronic device 102 in the form of a touchpad, or a touchscreen display device, allowing the handheld electronic device 102 to provide multiple different user manipulation devices on multiple different user interfaces, with or without different screens displayed to the user, with the user interface 606 able to change based on a particular virtual environment and/or actions/interactions available for a particular virtual object and the like. This may provide additional functionality and flexibility, and further enhancing the user's experience in the virtual environment. Hereinafter, the user interface 606 will be considered to be implemented in the form of a touchpad. For ease of discussion and illustration, various icons will be illustrated in the following figures representing various sections of the touchpad corresponding to user manipulatable sections of the touchpad that can receive user inputs via the touch sensitive surface of the touchpad.

As shown in FIG. 6A, the user interface 606 may include a first manipulation device 607 that may be manipulated by the user for selection of a feature and/or new virtual position or location. Manipulation of the first manipulation device 607 may, for example, cause a virtual beam 500 to be directed toward a virtual feature 550 to be selected and/or a virtual position/location to be selected, or may cause the light source 608 to generate the virtual beam 500 be directed from the handheld electronic device 102 toward the virtual feature 550 and/or virtual position/location to be selected. In an example in which the user interface 606 is implemented on a touch screen display of the handheld electronic device 102, the first manipulation device 607 may be an icon displayed on the touchscreen display, with user inputs received in response to touch inputs detected on the touch sensitive surface of the touchscreen display. However, in some implementations, the first manipulation device 607 may be, for example, a button that may be pressed by the user, or other type of manipulation device available on the handheld electronic device 102, such as, for example, a knob, a toggle, a slide, and the like.

The user interface 606 may include a second manipulation device 609 that may be manipulated to allow the user to adjust the user's scale, or perspective relative to the virtual features in the environment (or, adjust the scale of the virtual features in the virtual environment relative to the user). In the example shown in FIG. 6A, by manipulating (e.g., touching, tapping and the like) a plus button 609A of the second manipulation device 609 one or more times, the user may choose to increase his scale relative to the virtual features in the virtual environment, so that the user's view, or perspective, of the virtual environment reflects what would be experienced if the user were a larger size, making the virtual feature 550 selected at the virtual location B appear to be smaller as the user moves to the virtual position B. This type of action may, instead, be considered a scaling down of the virtual features in the virtual environment relative to the user, resulting in a similar change in view or perspective for the user.

In a similar manner, by tapping a minus button 609B of the second manipulation device 609 one or more times, the user may choose to scale himself down, so that the user's view, or perspective, of the virtual environment reflects what would be experienced if the user were a smaller size relative to the virtual features in the virtual environment, making the feature 550 selected at the virtual location B appear to be larger relative to the user as the user moves toward the virtual position B. This type of action may, instead, be considered a scaling up of the virtual environment relative to the user, resulting in a similar change in view or perspective for the user.

Figure 5B:
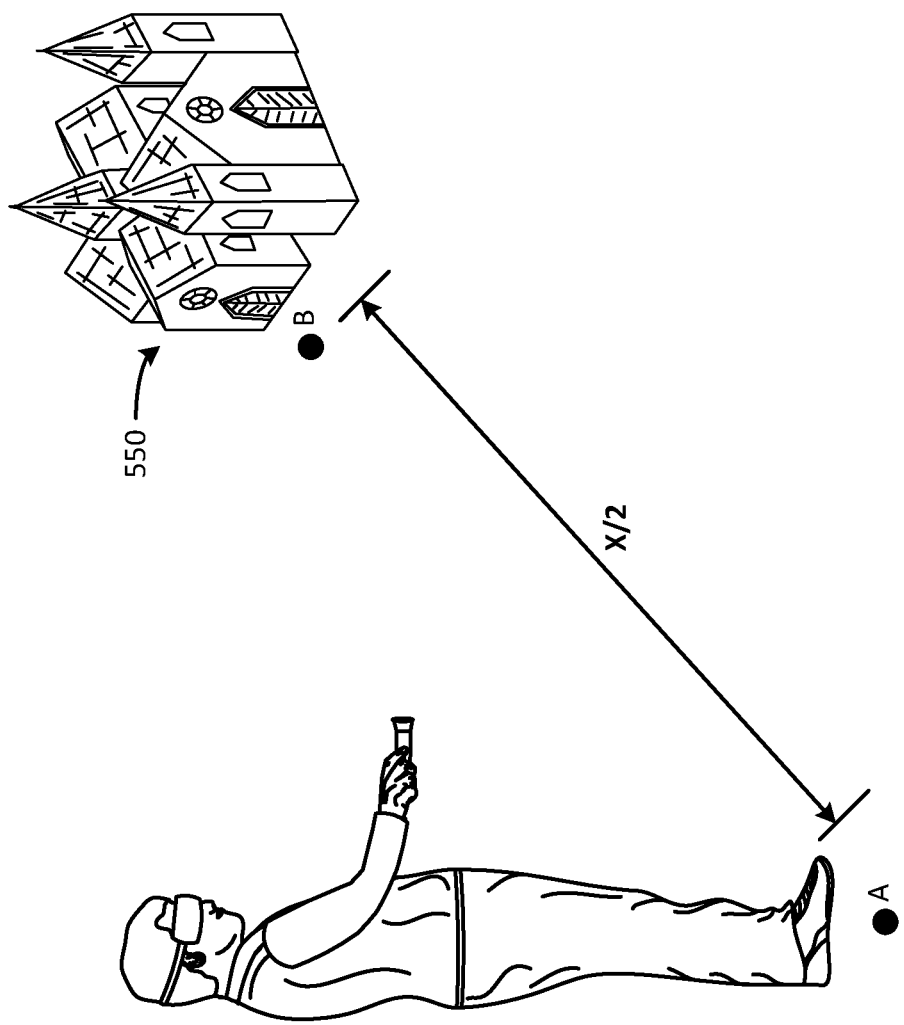

In some embodiments, one or more preset actions may be associated with manipulation of the second manipulation device 609. For example, a single input (e.g., a touch, a tap, and the like) on the plus button 609A may cause the user to move a fixed (virtual) amount (e.g., a percentage of a distance) closer to the selected virtual feature 550 at the virtual position B, and/or may cause the user to scale up relative to the virtual features in the virtual environment (or the virtual features in the virtual environment to scale down relative to the user) by a fixed (virtual) amount (e.g., a percentage scaling). For example, once the virtual feature 550 at the virtual position B has been selected (for example, by manipulation of the first manipulation device 607 directing the virtual beam 500 toward the feature 550 at the virtual position B, as shown in FIG. 5A), a single tap on the plus button 609A may cause the user to move a certain amount or virtual distance, for example, 50% of the virtual distance X between the user's current virtual position A and the selected virtual position B, and may cause the user to scale up (or the virtual environment to scale down) by, for example a certain amount, for example 50%, as shown in FIG. 5B. Similarly, a single input (e.g., a touch, a tap, and the like) on the minus button 609B may cause the user to move a fixed amount closer to the selected feature 550 at the virtual position B, and/or may cause the user to scale down (or the virtual environment to scale up) by a fixed amount. For example, once the virtual feature 550 at the virtual position B has been selected (for example, by manipulation of the first manipulation device 607 directing the virtual beam 500 toward the virtual feature 550 at the virtual position B, as shown in FIG. 5A), a single tap on the minus button 609B may cause the user to move, for example, 50% of the virtual distance X between the user's current virtual position A and the selected virtual position B, and may cause the user to scale down (or the virtual environment to scale up) by, for example, 50%, as shown in FIG. 5C.

Figure 5C:
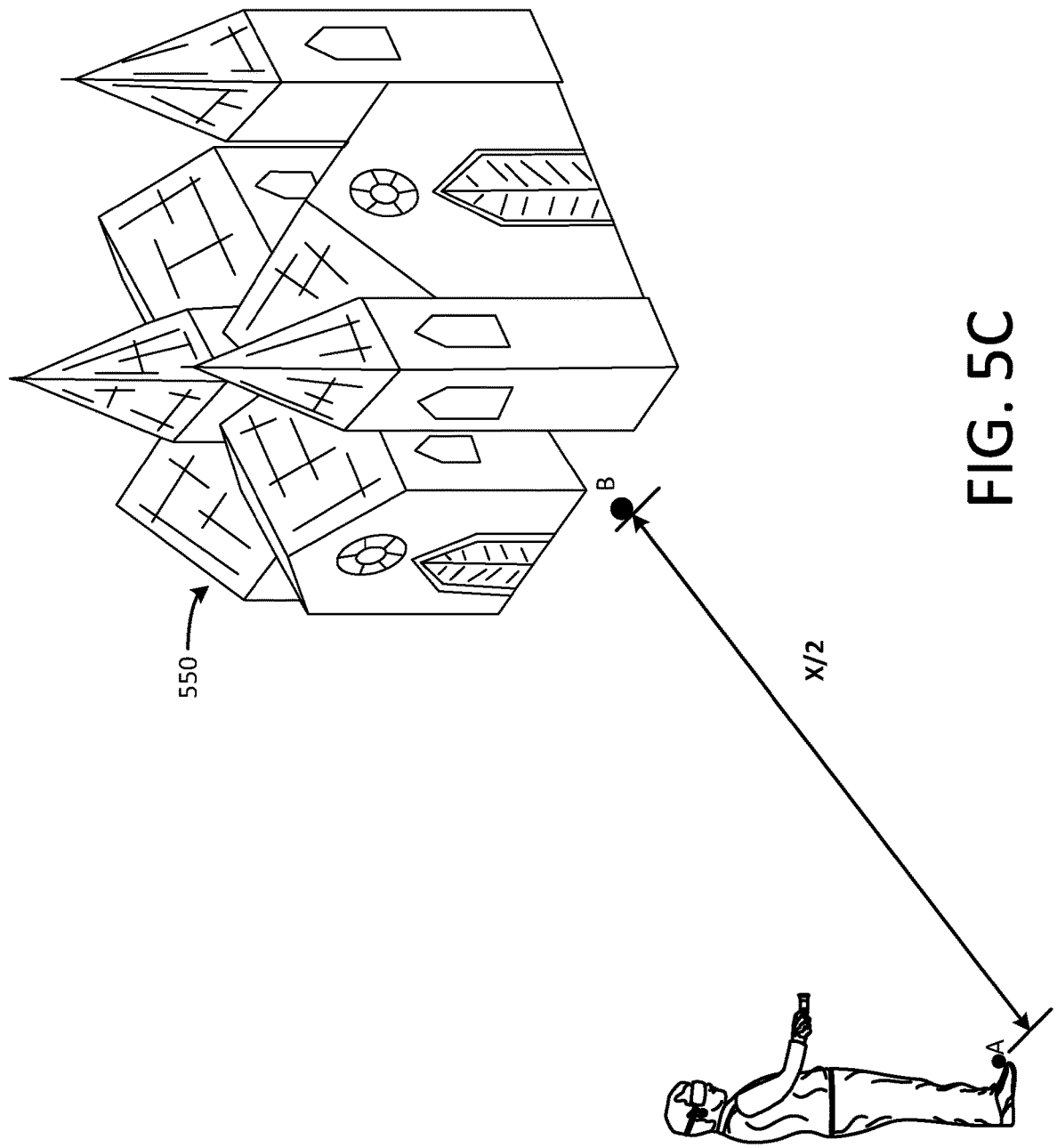

As the user moves from the virtual position A shown in FIG. 5A to the virtual position B, and the user virtually scales up (or the virtual features scale virtually down) as shown in FIG. 5B, or the user virtually scales down (or the virtual features scale virtually up) as shown in FIG. 5C, the virtual ground may remain a point of reference that remains constant as the user and/or the virtual environment scales as described. That is, as the user changes virtual position and/or relative scale, the user's feet remain on the virtual ground.

As described above, whether the user's movement (from the virtual position shown in FIG. 5A to the virtual position shown in FIG. 5B or the virtual position shown in FIG. 5C) is substantially immediate, or the user experiences a dynamic virtual animation during movement, upon completion of the movement, the user may come to a gradual stop, rather than an abrupt stop. This gradual stop, which may maintain some feeling of the user's momentum, may provide the user with a more natural transition into the virtual environment at the new virtual position.

In the example shown in FIG. 5B, a touch input to the plus button 609A causes the user to move half the virtual distance between the user's current virtual position A and the selected virtual feature 550 at the virtual position B, and to virtually scale up by 50%. Similarly, in the example shown in FIG. 5C, a touch input to the minus button 609B causes the user to move half the virtual distance between the user's current virtual position A and the selected feature 550 at the virtual position B, and to virtually scale down by 50%. Movement of 50% of the virtual distance between the virtual position A and the virtual position B, and the 50% scaling up or down, shown in FIGS. 5B and 5C, respectively, is simply one example of a preset amount of virtual movement and/or virtual scaling which may be associated with manipulation of one of the buttons of the second manipulation device 609. The amount of virtual movement may be greater than 50%, or less than 50%, and the amount of virtual scaling up or down may be greater than 50%, or less than 50%. An amount of virtual movement and/or virtual scaling in association with manipulation of one of the buttons of the second manipulation device 609 may be, for example, set by a manufacturer of the handheld electronic device 102 and/or by a developer of a virtual environment generated by the system, or may be set by the user in accordance with the user's personal preferences.

In some implementations, the user may continue to manipulate the plus and minus buttons 609A and 609B of the second manipulation device 609 until the desired virtual scale and/or the desired virtual distance from the virtual feature 550 at the virtual position B is achieved.

In some implementations, the user may manipulate the plus and minus buttons 609A and 609B of the second manipulation device 609 to achieve the desired virtual scale after arrival at the virtual position B. For example, the user may manipulate the first manipulation device 607 to direct the virtual beam 500 toward the virtual feature 550 at the virtual position B (as shown in, for example, FIG. 4B), and may then be moved to the virtual position B upon completion of the manipulation of the first manipulation device 607 (as shown in, for example, FIG. 4C). Once at the virtual position B, the user may then manipulate the plus and minus buttons 609A and 609B of the second manipulation device 609 to scale, i.e., increase and/or decrease a size of the user relative to the virtual feature 550 (or as desired.

As noted above, when the user interface is implemented in the form of a touch pad on the handheld electronic device 102, the first manipulation device 607 and the plus button 609A and the minus button 609B of the second manipulation device 609 may each correspond to a particular section of the touchpad. When the user interface is implemented in the form of a touchscreen display, the first manipulation device 607 and the plus button 609A and the minus button 609B of the second manipulation device 609 may each be represented as an icon displayed by the touchscreen display that may detect touch inputs at a corresponding portion of the touch sensitive surface of the touchscreen display. However, as noted above, the user interface 606 may be implemented such that the manipulation devices include buttons, knobs, toggles, slides and the like, and/or may be rendered as virtual objects for manipulation by the user in the virtual environment.

In some implementations, the user interface 606 provided on the handheld electronic device 102 may include the first manipulation device 607 as described above, and a second manipulation device 610 that may receive a touch and drag input, or a sliding, input, as shown in FIGS. 6B-6E. Returning to FIG. 5A, the user positioned at the first virtual position A relative to the virtual feature 550 at the second virtual position B may, for example, manipulate the handheld electronic device 102 to indicate the user wishes to move to the virtual feature 550 at the second virtual position B. This manipulation of the handheld electronic device 102 may cause the handheld electronic device 102 to direct the virtual beam 500 toward the virtual feature 550 at the second virtual position B. The user may then manipulate the second manipulation device 610 to scale up or scale down relative to the virtual features in the virtual environment (or scale the virtual features up or down relative to the user), depending on a manner of manipulation of the second manipulation device 610, for example, a swipe direction along the second manipulation device 610.

For example, the user may choose to scale himself up relative to the virtual features in the virtual environment. This may alter the user's view, or perspective, of the virtual environment relative to the fixed virtual point of reference, such as the virtual ground as described above, reflecting what would be experienced if the user were a larger size, with the user's feet still positioned on the virtual ground, making the virtual feature 550 selected at the virtual position B appear to be smaller as the user moves toward the virtual position B, while the user's feet remain on the virtual ground. This type of action may, instead, be considered a scaling down of the virtual features of the virtual environment, resulting in a similar change in view or perspective for the user.

Once the virtual feature 550 at the virtual position B has been selected as described above and shown in FIG. 5A, the user may move and scale up by, for example, a touch and drag input at the second manipulation device 610. For example, the user may apply a touch input at a first end 610A of the second manipulation device 610, as shown in FIG. 6B, and then drag the touch input along the second manipulation device 610 toward a second end 610B of the second manipulation device 610. Release of the touch and drag input at an interim position between the first end 610A and the second end 610B of the second manipulation device 610, as shown in FIG. 6C, may be indicative of the desired level of virtual movement and/or virtual scaling, and the user may be positioned at an interim virtual position and/or at a virtually scaled size/perspective in the virtual environment upon release of the touch input, as shown in FIG. 5B. That is, an amount of virtual movement, and/or an amount of virtual scaling, may be based on, or proportional to, a direction, or trajectory, and a length of the detected drag input, the direction, or trajectory, and length of the detected drag being determined based on a detected initial touch at the beginning of the touch and drag input and a detected release of the touch at the end of the touch and drag input.

Figure 6D:
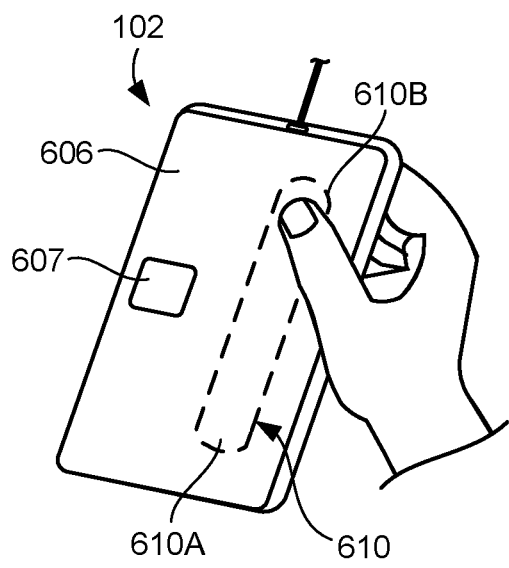
Figure 6E:
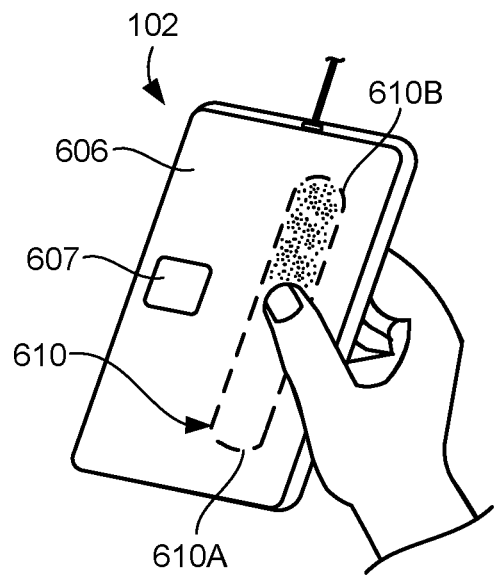

Similarly, once the virtual feature 550 at the virtual position B has been selected as described above and shown in FIG. 5A, the user may effect a virtual movement and virtual scaling down (or a virtual movement and a virtual scaling up of the virtual features in the virtual environment) by, for example, a touch and drag input at the second manipulation device 610. For example, the user may apply a touch input at the second end 610B of the second manipulation device 610, as shown in FIG. 6D, and then drag the touch input along the second manipulation device 610 toward the first end 610A of the second manipulation device 610. Release of the touch and drag input at an interim position between the second end 610B and the first end 610A of the second manipulation device 610, as shown in FIG. 6D, may be indicative of the desired level of virtual movement and/or virtual scaling, and the user may be positioned at an interim virtual position and/or at a virtual scaled size/perspective in the virtual environment upon release of the touch input, as shown in FIG. 5C. That is, an amount of virtual movement, and/or an amount of virtual scaling, may be based on, or proportional to, a direction, or trajectory, and a length of the detected drag input, the direction, or trajectory, and length of the detected drag being determined based on a detected initial touch at the beginning of the touch and drag input and a detected release of the touch at the end of the touch and drag input In other words, in some implementations, an amount of virtual movement and/or an amount of scaling associated with the manipulation of the second manipulation device 610 may correspond to the intermediate point, between the first end 610A and the second end 610B of the second manipulation device 610, at which a release of the touch and drag input is detected. For example, detection of a release of the touch and drag input at approximately half way between the first end 610A and the second end 610B of the second manipulation device 610, as shown in FIG. 6C or FIG. 6E, may cause the user to move approximately half the virtual distance between the user's current virtual position A and the selected virtual feature 550 at the virtual position B, and to scale up or down by approximately 50%. Release of the touch and drag input at a different intermediate point along the second manipulation device 610 may result in a different, corresponding amount of virtual movement and/or scaling.

In some implementations, the user's virtual movement and/or scaling may occur after release of the touch and drag input on the second manipulation device 610. In some implementations, the user's virtual movement and/or scaling may occur concurrent with the user's drag input along the second manipulation device 610, so that the user is moving and/or scaling as the user's finger drags along the second manipulation device 610, and stops as the user achieves the desired amount of virtual movement and/or scaling. In either instance (whether the shift in user position is substantially immediate or dynamically animated), once the virtual movement has been completed, upon completion of the virtual movement, the user may come to a gradual stop, rather than an abrupt stop. This gradual stop, which may maintain some feeling of the user's momentum, may provide the user with a more natural transition into the virtual environment at the new position.

In some implementations, the user may manipulate the second manipulation device 610 to achieve the desired virtual scale after arrival at the virtual position B. For example, the user may manipulate the first manipulation device 607 to direct the virtual beam 500 toward the virtual feature 550 at the virtual position B (as shown in, for example, FIG. 4B), and may then be moved to the virtual position B upon completion of the manipulation of the first manipulation device 607 (as shown in, for example, FIG. 4C). Once at the virtual position B relative to the selected virtual feature 550, the user may then manipulate the second manipulation device 610 as described above to increase and/or decrease virtual scale as desired.

As described above, when the user interface is implemented in the form of a touchpad, or a touchscreen display, on the handheld electronic device 102, the first manipulation device 607 and the second manipulation device 610 may each correspond to a particular section of the touchpad, and/or may each be represented as an icon displayed by the touchscreen display, that may detect touch inputs, touch and drag inputs, and a touch release, at a corresponding portion of the touch sensitive surface of the touchpad and/or touchscreen display. However, as noted above, the user interface 606 may be implemented such that the manipulation devices include buttons, knobs, toggles, slides and the like, and/or virtual objects rendered in the virtual environment for user manipulation.

Figure 7B:
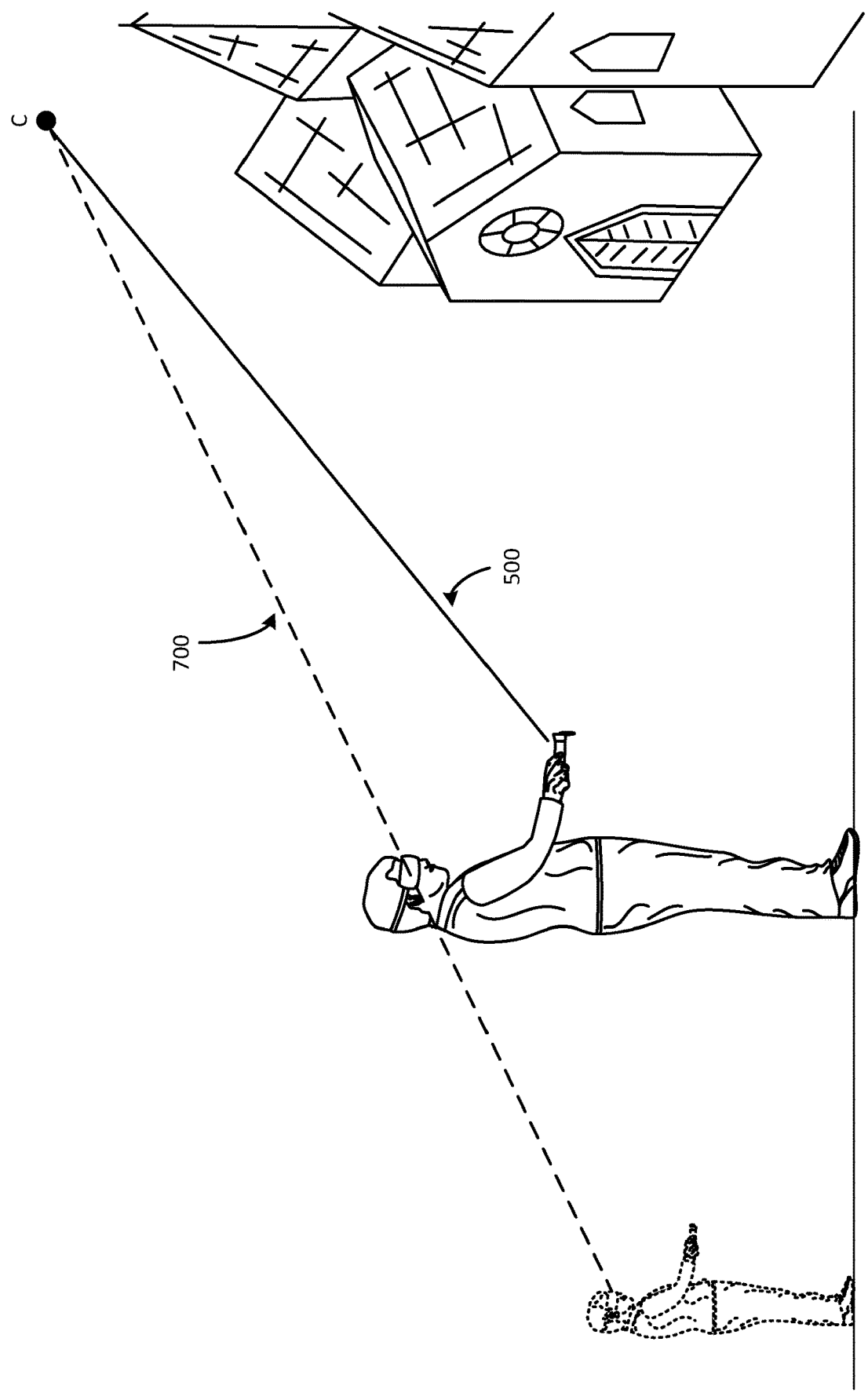

In some implementations, a user's virtual scale in a virtual environment may be adjusted based on a virtual trajectory defined by the user. As shown in FIG. 7A, the user may direct the virtual beam 500 toward a point C in the virtual space. In this instance, the point C is not identified with any particular virtual feature in the virtual space, but instead defines a virtual scaling trajectory 700 the user wishes to follow. The virtual scaling trajectory 700 may be defined by a virtual line extending between a first user point of reference, for example, the user's head, for example, a set point on the HMD 100 worn by the user, and the point C. Through manipulation of one of the manipulation devices on the user interface of the handheld electronic device 102, the user may then virtually move and scale along this virtual trajectory 700, with the user's feet remaining on the virtual ground, until a user input is received (for example, through the user interface of the handheld electronic device 102, such as, for example, a release of a touch from a touch sensitive surface of the handheld electronic device 102) indicating the desired amount of virtual movement and/or scaling has been achieved, as shown in FIG. 7B.

In the example shown in FIGS. 7A-7B, as the user virtually moves and/or scales along the virtual scaling trajectory 700, the user's feet remain on the constant point of reference, or virtual ground, while the user's head follows the virtual trajectory 700 to virtually move and/or scale in the virtual environment. The virtual beam 500, originating at the first user point of reference (for example, the point on the user's headset, as described above) directed to the point C in the virtual space, indicates the user intends to scale virtually up in size, or perspective, relative to the virtual environment. As the virtual movement and/or scaling is carried out by the system (based on the input(s) received through the user interface of the handheld electronic device 102), the user's perspective may be altered such that a second user point of reference, such as, for example, the user's feet remain on the ground, while the virtual altitude of the first user point of reference, e.g., the user's head, in the virtual space changes, or increases as in this example. In a situation in which a virtual movement distance is relatively large, a speed of the virtual movement may increase as the virtual altitude of the user's head increases, so that an overall effect is one of a constant velocity movement. That is, by increasing speed as the user's virtual size and virtual head altitude with respect to second user point of reference, or virtual ground, (and thus perspective) increases, the user may experience what appears to be substantially constant speed. Without this type of increasing speed, or acceleration, as the virtual altitude of the user's head increases and the user's size is scaled up in this manner, the user may feel as if the virtual movement is slowing, or decelerating, due to the increase in the user's size/scale/perspective relative to the size of the user's surroundings in the virtual environment.

Similarly, if the virtual trajectory were instead directed downward (instead of upward as shown in FIGS. 7A-7B), the user's speed may be decreased as the user's virtual size and virtual head altitude with respect to the second user point of reference, or virtual ground, and thus perspective, decreases, so that the user experiences what appears to be substantially constant speed.

As noted above, once movement has been completed, upon completion of the movement, the user may come to a gradual stop, rather than an abrupt stop. This gradual stop, which may maintain some feeling of the user's momentum, may provide the user with a more natural transition into the virtual environment at the new position and scale.

Figure 8A:
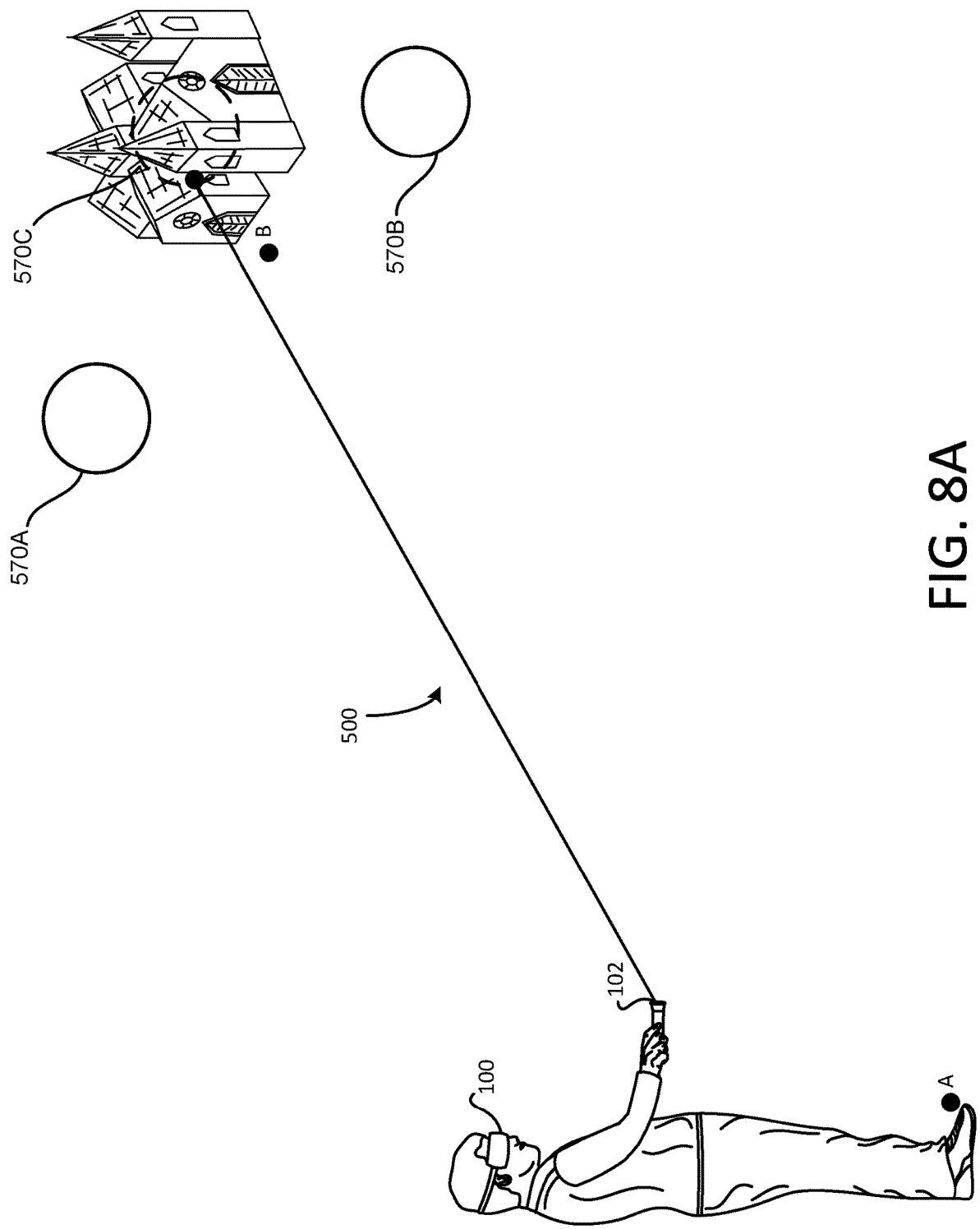
FIGS. 8A-8B are third person views illustrating movement of a user in a virtual photo sphere in an augmented and/or virtual reality environment, in accordance with implementations described herein.
Figure 8B:
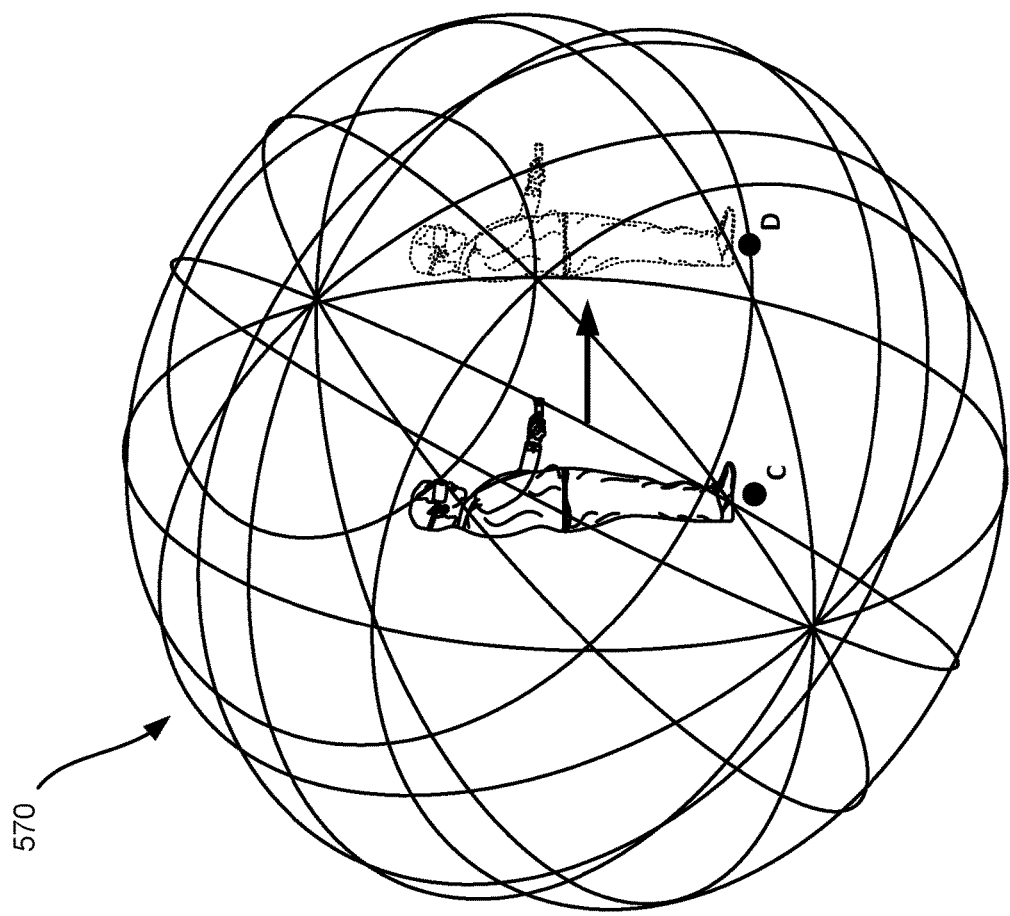

As shown in FIG. 8A, in some implementations, one or more virtual photo spheres 570 (for example, first, second and third virtual photo spheres 570A, 570B, 570C) may be available to the user for selection in the virtual environment. Each photo sphere may provide a 360-degree panoramic experience of, for example, a particular feature, location and the like, in the virtual environment. To move to one of the virtual photospheres 570, the user may, for example, direct the virtual beam 500 generated by the handheld electronic device 102 as described above toward a selected one of the virtual photo spheres 570, such as, for example, the third virtual photo sphere 570C, to move into a 360-degree panoramic experience of an interior of the virtual feature 550, as shown in FIG. 8A. Upon further manipulation of the handheld electronic device 102, for example, release of a button directing the virtual beam 550 to the selected virtual photo sphere 570C, the user may be moved, or teleported, or transported, to the selected virtual photo sphere 570C, as shown in FIG. 8B.

When moving, or transporting, or teleporting to the selected virtual photo sphere 570, the user may also choose to adjust in scale relative to the features in the virtual environment as discussed in detail above. In particular, when moving to the selected virtual photo sphere 570, the user may choose to increase is size/scale, or decrease in size/scale, relative to the virtual elements included in the 360-degree panoramic experience provided by the selected virtual photo sphere 570 in the manner described above in detail.

Once within the virtual photo sphere 570, the user may move within the virtual photo sphere 570. For example, the user may turn to view a different portion of the 360-degree panoramic experience provided by the virtual photo sphere 570, and/or the user may walk from a virtual position C to a virtual position D within the virtual photo sphere 570, as shown in FIG. 8B, to approach, or get closer to, a virtual element included in the 360-degree panoramic experience provided by the virtual photo sphere 570. In some implementations, the user may, for example, walk within the virtual photo sphere 570 to what may be considered an edge of the 360-panoramic virtual display within the virtual photo sphere 570, with the virtual elements displayed in the 360-degree panoramic experience of the virtual photo sphere 570 displayed in front of the user appearing larger as the user walks in the direction of, or approaches, the virtual elements. Similarly, if the user were to turn around, for example, turn 180 degrees after arriving at the virtual position D, the virtual elements that were once behind the user may appear smaller, as the user has walked away from the virtual elements displayed in that portion of the virtual photo sphere 570.

Figure 9:
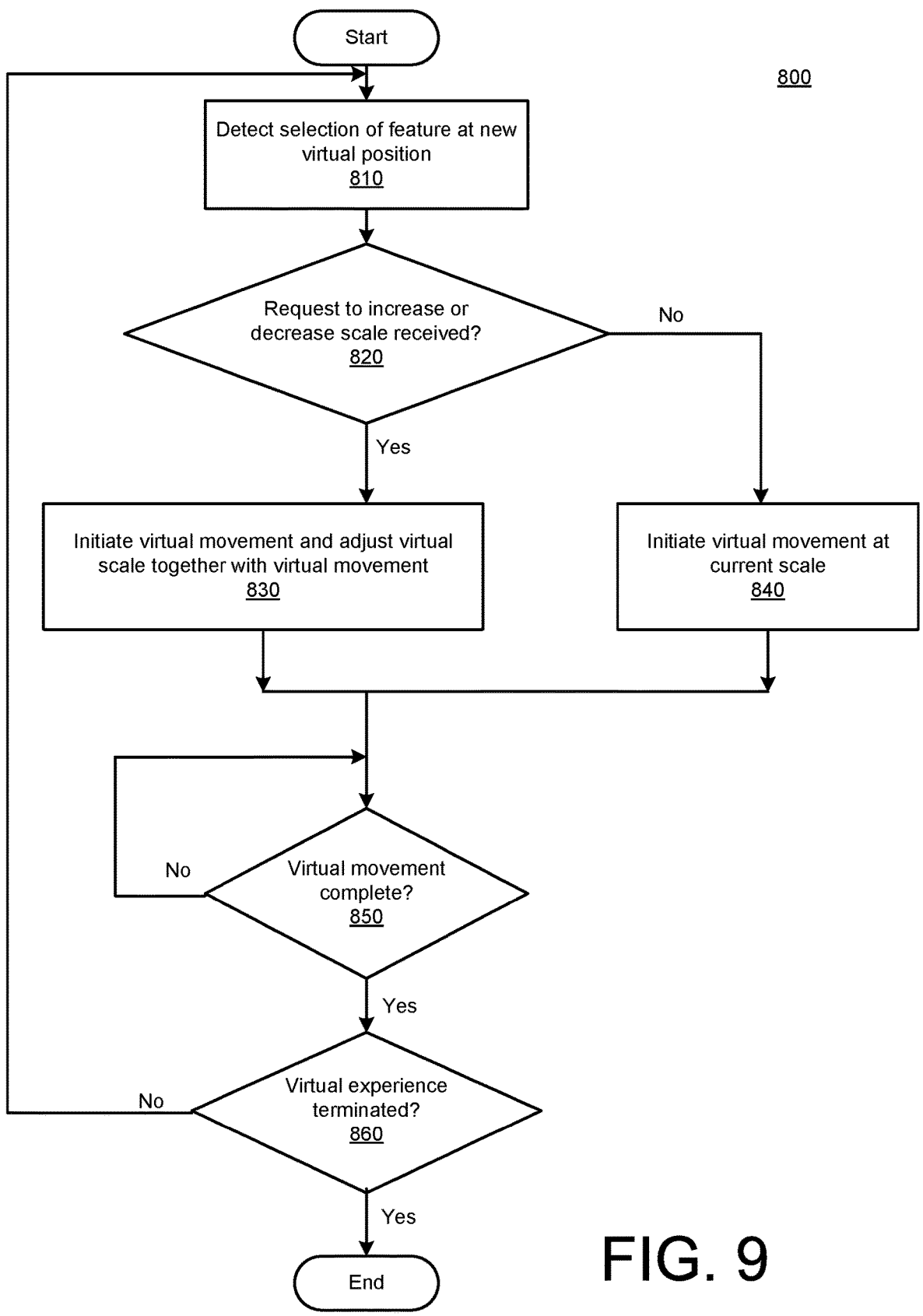
FIG. 9 is a flowchart of a method of moving and scaling in an augmented and/or virtual reality environment, in accordance with implementations described herein.

A method 800 of moving and/or scaling in a virtual reality environment, in accordance with implementations described herein, is shown in FIG. 9. The method 800 shown in FIG. 8 may be carried out, for example, by an HMD 100 paired with a handheld electronic device 102 as described above in detail. Upon detection of a selection of a virtual feature at a new virtual position within the virtual environment, indicating a user input to move from a current position toward the selected virtual feature at the new virtual position (block 810), it may be determined whether or not a command to increase and/or decrease a user scale relative to the virtual environment has been received (block 820). If a command to adjust scale has been received, virtual movement towards the selected virtual feature at the new virtual position may be initiated, and adjustment of virtual scale of the user relative to the virtual environment may be carried out together with the virtual movement (block 830), as described above in detail with respect to FIGS. 5A-5C, 6A-6E and 7A-7B. If a command to adjust scale has been not been received, virtual movement towards the selected feature at the new virtual position may be initiated, and carried out (block 840), as described above in detail with respect to FIGS. 4A-4C. Upon completion of the virtual movement and/or scaling (block 850), the process may be repeated until the virtual experience is terminated (block 860).

Figure 10:
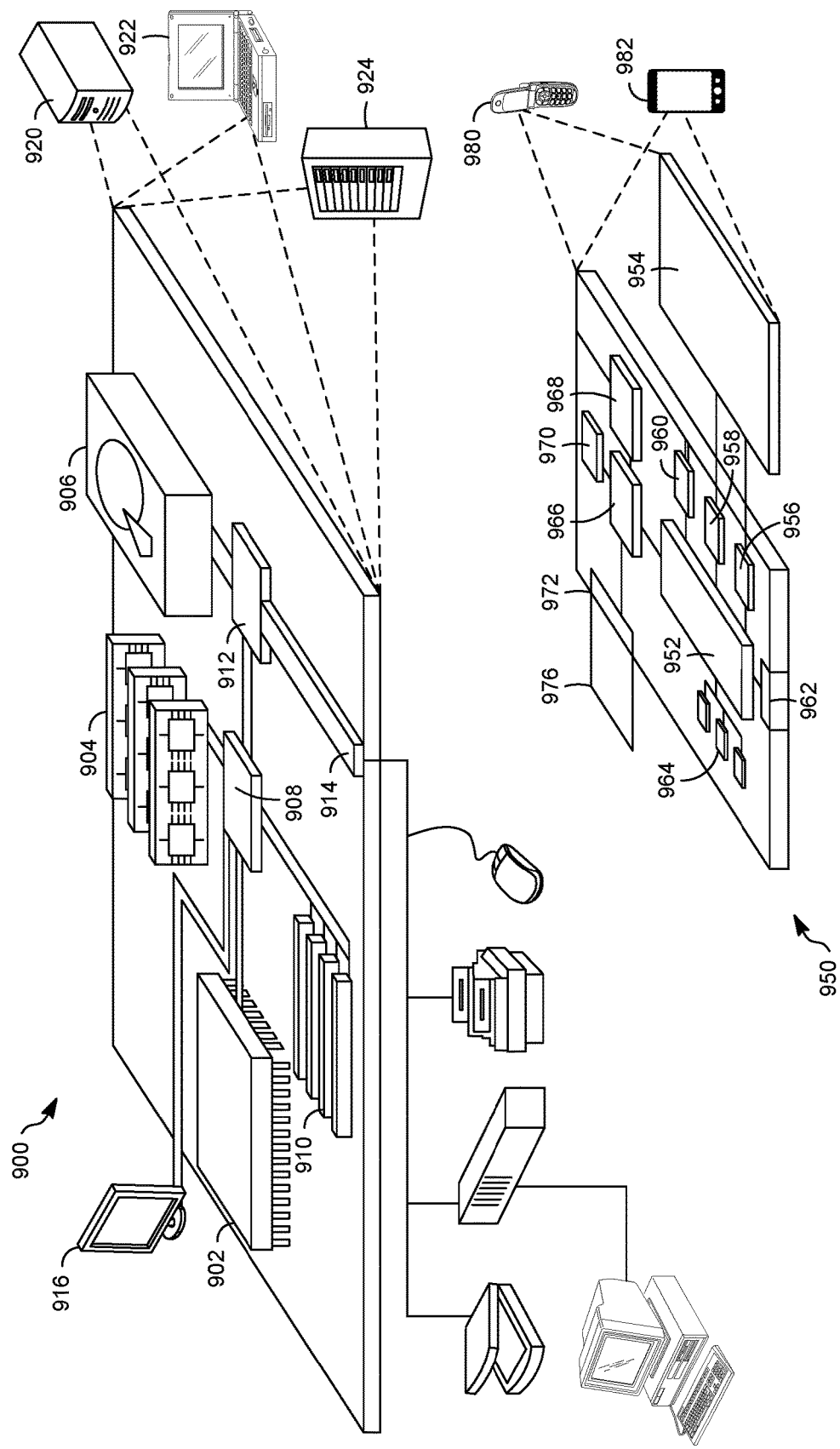
FIG. 10 shows an example of a computer device and a mobile computer device that can be used to implement the techniques described herein.

FIG. 10 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   generating a virtual environment;
   detecting, at an electronic device, a first input, the first input indicating a selection of a virtual feature in the virtual environment;
   detecting, at the electronic device, a second input, the second input indicating a change in a virtual position of a user relative to the selected virtual feature and a change in a virtual scale of the user relative to the virtual feature; and
   in response to the second input,
      teleporting the user from a first virtual position to a second virtual position relative to the selected virtual feature along a first virtual trajectory defined by a virtual line extending between a first point of reference associated with the user and the selected virtual feature, and
      adjusting the virtual scale of the user relative to the virtual feature, the adjusting including modification of a second virtual trajectory defined by a second virtual line extending between a second point of reference associated with the user and the selected virtual feature, the second input including a detected light beam emitted by the electronic device.

2. The method of claim 1, wherein the virtual feature is included in a photo sphere configured to display a three-hundred and sixty degree panoramic image of the virtual environment.

3. The method of claim 2, wherein the second input further includes a touch input received at a user interface of the electronic device, and wherein adjusting the virtual scale includes:
   detecting the touch input at a first portion of the user interface; and
   increasing a virtual scale of the user relative to the virtual feature by a set amount in response to the detected touch input at the first portion of the user interface.

4. The method of claim 3, wherein detecting a touch input at a first portion of the user interface includes detecting multiple touch inputs at the first portion of the user interface, and increasing the virtual scale of the user relative to the virtual feature by the set amount in response to each touch input detected at the first portion of the user interface.

5. The method of claim 3, wherein adjusting the virtual scale includes:
   decreasing a virtual scale of the user relative to the virtual feature by a set amount in response to the detected touch input.

6. The method of claim 3, wherein the second input includes a touch and drag input received at the user interface, and wherein adjusting at least one of the virtual position or the virtual scale includes:
   detecting the touch and drag input at the user interface, including detecting an initial touch point, detecting a release point, and detecting a drag trajectory along the user interface between the detected initial touch point and the detected release point;
   virtually teleporting the user a virtual distance closer to the selected virtual feature in response to the detected touch and drag input; and
   virtually increasing or decreasing a virtual scale of the user relative to the virtual feature in response to the detected touch and drag input.

7. The method of claim 6, wherein virtually moving the user a virtual distance closer to the selected virtual feature includes determining the virtual distance based on a detected length of the drag trajectory along the user interface and wherein virtually increasing or decreasing a virtual scale of the user relative to the virtual feature includes:
   detecting a direction of the drag trajectory;
   virtually increasing the scale of the user relative to the virtual feature based on the detected length of the drag trajectory when the detected direction of the drag trajectory is a first direction; and
   virtually decreasing the scale of the user relative to the virtual feature based on the detected length of the drag trajectory when the detected direction of the drag trajectory is a second direction.

8. The method of claim 1, further comprising:
   detecting a third input, the third input identifying a set virtual point of reference in the virtual environment; and
   adjusting a virtual scale of the user relative to the virtual environment in response to the third input, including adjusting the virtual scale of the user along an imaginary line extending between at least one user set point and the point of reference in the virtual environment.

9. The method of claim 8, wherein adjusting a virtual scale of the user relative to the virtual environment in response to the third input includes adjusting the virtual scale of the user along the imaginary line such that a first user set point follows the imaginary line as the user virtually scales in size with respect to the virtual environment, while a second user set point remains virtually grounded with respect to the virtual environment.

10. The method of claim 1, further comprising:
    generating, for display in the virtual environment, a virtual animation of the teleporting of the user from the first virtual position to the second virtual position, the virtual animation depicting a virtual user traveling within the virtual environment and arriving at the second virtual position with a gradual stop indicating a decreased momentum.

11. A system, comprising:
    a computing device configured to generate an immersive virtual environment, the computing device including:
       a memory storing executable instructions; and
       a processor configured to execute the instructions to cause the computing device to:

generate an augmented reality environment;
detect, at an electronic device, a first input, the first input indicating a selection of a virtual feature in the augmented reality environment;
detect, at the electronic device, a second input, the second input indicating a change in virtual position of a user relative to the selected virtual feature and a change in virtual scale of the user relative to the virtual feature; and
in response to the second input,
   teleport the user from a first virtual position to a second virtual position relative to the selected virtual feature along a first virtual trajectory defined by a virtual line extending between a first point of reference associated with the user and the selected virtual feature, and
   adjust a virtual scale of the user relative to the virtual feature, the adjusting including modification of a second virtual trajectory defined by a second virtual line extending between a second point of reference associated with the user and the selected virtual feature, the second input including a detected light beam emitted by the electronic device and directed from the electronic device toward the virtual feature.

12. The system of claim 11, wherein the second input further includes a touch input received at a user interface of the electronic device, and wherein, in adjusting the virtual scale includes:
detecting a touch input at a manipulation device of the user interface;
virtually moving the user a set virtual distance closer to the selected virtual feature in response to the detected touch input at the manipulation device of the user interface; and
increasing or decreasing a virtual scale of the user relative to the augmented reality environment by a set amount in response to the detected touch input at the manipulation device of the user interface.

13. The system of claim 12, wherein the manipulation device includes an increase device and a decrease device, and wherein the processor is configured to increase the virtual scale of the user by the set amount relative to the augmented reality environment in response to manipulation of the increase device, and to decrease the virtual scale of the user by the set amount relative to the augmented reality environment in response to manipulation of the decrease device.

14. The system of claim 12, wherein the second input includes a touch and drag input received at the user interface, and wherein, in adjusting at least one of the virtual position or the virtual scale, the processor is configured to:
detect the touch and drag input at the user interface, including detecting an initial touch point, a release point, and a drag trajectory along the user interface between the detected initial touch point and the detected release point;
virtually teleport the user a virtual distance closer to the selected virtual feature in response to the detected touch and drag input; and
increase or decrease a virtual scale of the user relative to the virtual feature in response to the detected touch and drag input.

15. The system of claim 14, wherein, in increasing or decreasing the virtual scale relative to the augmented reality environment, the processor is configured to:

detect a direction and a length of the drag trajectory;
increase the virtual scale relative to the virtual feature based on the detected length of the drag trajectory when the detected direction of the drag trajectory is a first direction; and
decrease the virtual scale relative to the virtual feature based on the detected length of the drag trajectory when the detected direction of the drag trajectory is a second direction.

16. The system of claim 11, wherein the processor is further configured to execute the instructions to cause the computing device to:
generate, for display in the augmented reality environment, a virtual animation of the teleporting of the user from the first virtual position to the second virtual position, the virtual animation depicting a virtual user traveling within the augmented reality environment and arriving at the second virtual position with a gradual stop indicating a decreased momentum.

17. A method, comprising:
detecting, with a processor, a first input, the first input indicating a selection of a virtual feature in an augmented reality environment;
detecting, with the processor, a second input, the second input indicating a change in a virtual position of a user relative to the selected virtual feature and a change in a virtual scale of the user relative to the virtual feature; and
in response to the second input,
   teleporting the user from a first virtual position to a second virtual position relative to the selected virtual feature along a first virtual trajectory defined by a virtual line extending between a first point of reference associated with the user and the selected virtual feature, and
   adjusting the virtual scale of the user relative to the virtual feature, the adjusting including modification of a second virtual trajectory defined by a second virtual line extending between a second point of reference associated with the user and the selected virtual feature, the second input including a detected light beam emitted by the electronic device, and directed from the electronic device toward the virtual feature.

18. The method of claim 17, wherein teleporting the user and adjusting the change in virtual scale relative to the virtual feature occur while maintaining a virtual portion of the user on a virtual ground surface as other virtual portions of the user are adjusted according to the adjusted virtual scale.

19. The method of claim 17, wherein the electronic device includes at least one user interface that includes a touchscreen display, and wherein the processor is configured to:
detect the first input including a touch input applied at a first preset portion of a touch sensitive surface of the touchscreen display, a selection icon being displayed at the first preset portion of the touch sensitive surface of the touchscreen display.

20. The method of claim 19, wherein the user interface includes a touchscreen display, and wherein the processor is configured to:
detect multiple touch inputs at a manipulation device associated with the user interface, and to sequentially move the user a set virtual distance closer to the selected virtual feature and to sequentially increase or decrease the virtual scale of the user relative to the virtual feature by a set amount in response to each touch input detected in a portion of the user interface.

* * * * *